United States Patent
Mori et al.

(10) Patent No.: US 8,434,813 B2
(45) Date of Patent: May 7, 2013

(54) DRAINAGE STRUCTURE OF WEATHER STRIP

(75) Inventors: Kousuke Mori, Hiroshima (JP);
Hirofumi Ogawa, Hiroshima (JP);
Shinya Murakami, Machida (JP)

(73) Assignee: Nishikawa Rubber Co., Ltd.,
Hiroshima-shi, Hiroshima-ken (JP)

( * ) Notice: Subject to any disclaimer, the term of this patent is extended or adjusted under 35 U.S.C. 154(b) by 0 days.

(21) Appl. No.: 13/298,956

(22) Filed: Nov. 17, 2011

(65) Prior Publication Data
US 2012/0161467 A1    Jun. 28, 2012

(30) Foreign Application Priority Data
Dec. 22, 2010    (JP) .................................. 2010-285891

(51) Int. Cl.
*B60J 10/02*    (2006.01)

(52) U.S. Cl.
USPC ........................................ 296/146.2; 296/93

(58) Field of Classification Search ............... 296/146.2, 296/146.16, 154, 146.9, 206, 146.3, 146.14, 296/93; 49/476.1, 500.1, 440, 502; 277/921, 277/644
See application file for complete search history.

(56) References Cited

U.S. PATENT DOCUMENTS

| 4,919,471 A * | 4/1990 | Seino et al. .................... 296/154 |
| 5,106,146 A * | 4/1992 | Hanlon ......................... 296/154 |
| 5,553,428 A * | 9/1996 | Watanabe et al. ............... 52/208 |
| 7,178,809 B2 * | 2/2007 | Kuzuya et al. ................. 277/631 |
| 7,197,850 B2 * | 4/2007 | Mizutani et al. ............. 49/498.1 |
| 7,438,344 B2 * | 10/2008 | Williams et al. ......... 296/107.05 |

FOREIGN PATENT DOCUMENTS

| JP | 10-071860 | 3/1998 |
| JP | 2006-264594 | 10/2006 |
| JP | 2006264594 A * | 10/2006 |

* cited by examiner

*Primary Examiner* — Jason S Morrow
*Assistant Examiner* — E. Turner Hicks
(74) *Attorney, Agent, or Firm* — Robert P. Michal; Lucas & Mercanti, LLP

(57) ABSTRACT

A drainage structure of a die molded part 102 on an upper side of a weather strip 10 includes an installation base member 11 installed on a front pillar 4 of a retractable roof vehicle, a hollow seal part 12 in elastic contact with a door glass 5, and a seal lip 13 in elastic contact with an inner-cabin side surface of the door glass 5 and thereby forming an eaves-trough-shaped water receiving part 14. A lower side wall surface 12b of the hollow seal part 12 has a fin 40 formed on an outer-cabin side edge 110 thereof and a bead part 30 formed from the outer-cabin side edge 110 of the lower side wall surface 12b to a position beyond an elastic contact position on the bead part with the door glass 5 toward an inner-cabin side and the bead part 30 is inclined downward.

6 Claims, 6 Drawing Sheets

DRAINAGE STRUCTURE OF WEATHER STRIP

This application claims the benefit under 35 USC 119 of JP Patent Application JP 2010-285891 filed Dec. 22, 2010, the entire disclosure of which is incorporated herein by reference.

BACKGROUND OF THE INVENTION

The present invention relates to drainage structure of weather strips installed along door opening edges of retractable roof vehicles including convertible vehicles or hard top vehicles, that make elastic contact with door glasses to seal outside and inside of vehicles.

FIG. 6 is an external view of one type of retractable roof vehicles of which roofs that open and close are folded to open. The roof comprises a soft top 1 which is folded and put away in a trunk 2 on a lower rear side of a vehicle. Another roof of the retractable roof vehicle comprises a roof panel and a back window panel at the back of the roof panel instead of the soft top 1, which are folded and put away in the trunk 2 while the roof panel as folded is piled on the back window panel. Such vehicles are generally called retractable hard top, coupe cabriolet or coupe convertible.

In the retractable roof vehicle, a front pillar 4 and the soft top 1 as an opening edge of a door 3 have a weather strip 10 installed on side edges thereof via tape 20 (alternatively, the weather strip 10 may also be fit in holders including retainers). The weather strip 10 makes elastic contact with a door glass (side glass) 5 that lifts or lowers when the door 3 is closed to seal outside and inside of the vehicle.

As shown in FIG. 7 to FIG. 9, the weather strip 10 installed on the side edge of the front pillar 4 comprises an extrusion molded part 101 and die molded parts 102, 103 which are connected to the extrusion molded part 101 and are respectively on an upper side and a lower side of a vehicle when the weather strip 10 is assembled on the vehicle. The die molded part 102 on the upper side is connected to an edge of a header weather strip 9 installed on a header 7 which fixes an upper end of a front glass 6 whereas the die molded part 103 on the lower side has a gusset 21 installed thereon, which is unified with a door mirror (not shown).

The weather strip 10 comprises: an installation base member 11 having the tape 20 adhered thereon; a hollow seal part 12 integrally molded with the installation base member 11, which makes elastic contact with a top end 5a of the door glass 5 that lifts or lowers; and a seal lip 13 extending from a lower side of the hollow seal part 12 toward an outer-cabin side, which makes elastic contact with an inner-cabin side surface of the of the door glass 5 that lifts or lowers. A top end of the seal lip 13 makes elastic contact with the inner-cabin side surface of the door glass 5 in such a manner as to curve upward, thereby forming an eaves-trough-shaped water receiving part 14 on a base root side thereof.

The seal lip 13 has a hollow part 15 provided on an inner-cabin side thereof. The hollow part 15 has a lip 16 on the inner-cabin side thereof which abuts interior material (not shown) including garnish.

The die molded part 103 on the lower side of the weather strip 10 has a drainage hole 22 formed thereon which bores from the water receiving part 14 to the hollow part 15 so that water 130 guided from an upper side of the weather strip 10 to the water receiving part 14 on a lower side is further guided to the hollow part 15 via the drainage hole 22. The water 130 (131) guided to the hollow part 15 is drained outside the vehicle from a front side of the vehicle.

Various techniques have been adopted concerning the drainage structure of the weather strips of which hollow seal part and seal lip make elastic contact respectively with the top end and the inner-cabin side surface of the door glass that lifts or lowers, thereby doubly-sealing the door glass from an upper side and a lower side (see the Japanese unexamined Patent Publications No. 2006-264594 and 10-71860).

The Japanese unexamined Patent Publication No. 2006-264594 discloses to mold only a water receiving lip of the die molded part on the upper side by solid rubber, which protrudes toward the outer-cabin side compared with the door glass and receives water dripping from a soft top. The Japanese unexamined Patent Publication No. 10-71860 discloses to form a seal lip on a parting on a top end of the soft top in such a manner as to protrude toward the outer-cabin side so that the seal lip receives the water which flows along the soft top.

According to the ordinary weather strip 10 shown in FIG. 10, when the glass 5 lifts up, the top end 5a of the door glass 5 is wrapped up by a lower side wall surface 12b of the hollow seal part 12, which is thrust up and curved by the top end 5a. Accordingly, even in case the door glass 5 is subjected to high pressure water of car washing, the water 130 is prevented from entering the inner-cabin side from the outer-cabin side via a space between the top end 5a of the door glass 5 and the lower side wall surface 12b of the hollow seal part 12. In addition, in case the water 130 enters the inner-cabin side, the water 130 that flows down an inner-cabin side surface of the door glass 5 is dammed up by the seal lip 13 and is guided to the water receiving part 14.

Unfortunately, however, the high pressure water 130 of car washing directly poured on the weather strip 10 shown in FIG. 10 as well as the water 130 of rain and car washing shown in FIG. 7 flowed down from the soft top 1 collects on an outer-cabin side edge 110 of the lower side wall surface 12b forming the hollow seal part 12, that is a connecting part of an outer-cabin side wall surface 12a forming the hollow seal part 12 in the same manner as the lower side wall surface 12b and the lower side wall surface 12b (the water that collects on the outer-cabin side edge 110 of the lower side wall surface 12b is painted over with black in FIG. 10). The water 130 that collects on the outer-cabin side edge 110 of the lower side wall surface 12b flows along the outer-cabin side edge 110 which is a longitudinal direction in which the weather strip 10 extends (in a front direction of the vehicle at this place), reaches a top end on a front side of the door glass 5 without entering the drainage hole 22 and collects on the gusset 21. Such a structure has caused problems that the collected water 130 (132) enters vehicle interior and causes water leak when the door 3 is opened.

In addition, when the door glass 5 is subjected to high pressure water as shown in FIG. 10, the water 130 directly reaches a part of the lower side wall surface 12b which is on the inner-cabin side compared with the outer-cabin side edge 110 and on the outer-cabin side compared with the door glass 5. Also, a part of the water 130, which collects on the outer-cabin side edge 110 of the lower side wall surface 12b advances and is transmitted to a space between the top end 5a of the door glass 5 and the lower side wall surface 12b of the hollow seal part 12 for the effect of capillary phenomenon. In both cases, the water 130 flows down in a frontward direction along the edge of the top end 5a of the door glass 5 and collects on the gusset 21 without entering the drainage hole 22. Such a structure has caused a problem that the collected water 130 (132) enters the vehicle interior when the door 3 is opened.

Further, when the door glass 5 is lowered as shown in FIG. 11 after rain or car washing, the water 130 which soaks into the soft top 1 made of cloth collects on the outer-cabin side edge 110 of the lower side wall surface 12b (the water that collects on the outer-cabin side edge 110 of the lower side wall surface 12b is painted over with black in FIG. 11). Accordingly, the water 130 flows down in the longitudinal direction in which the weather strip 10 extends and collects on the gusset 21 without entering the drainage hole 22. Such a structure has caused a problem that the collected water 130 (132) enters the vehicle interior when the door 3 is opened.

Also, in case the water 130 flows along the header weather strip 9 because of heavy rain or heavy amount of car washing water or wind while the door glass 5 is lowered, the water 130 (133) may directly drip inside the vehicle interior and cause the water leak.

While the above-mentioned prior arts relate to the drainage structure of the weather strip 10 installed on the side edge of the front pillar 4, the weather strips installed on side edges of front pillars of hard top vehicles, not only of retractable roof vehicles, cause the same problems.

In addition, the drainage structures of the weather strip according to the Japanese unexamined Patent Publications No. 2006-264594 and 10-71860 do not provide measures to prevent the water 130 which is collected on the outer-cabin side edge 110 of the lower side wall surface 12b of the hollow seal member 12 forming the weather strip 10 from flowing frontward in the longitudinal direction of the weather strip 10 and along the top end 5a of the door glass 5, and finally entering the vehicle interior.

Therefore, an object of the present invention is to provide the drainage structure of the weather strips capable of preventing the rainwater or car-washing water from entering the vehicle interior from the side edges of the front pillars of the retractable roof vehicles or the hard top vehicles.

SUMMARY OF THE INVENTION

In order to achieve the above-mentioned object, according to one aspect of the invention, a drainage structure of a die molded part (102) on an upper side of a weather strip (10) is provided, comprising: an installation base member (11) installed on a side edge of a front pillar (4) of a retractable roof vehicle or a hard top vehicle; a hollow seal part (12) provided downward on an outer-cabin side with respect to said installation base member (11), which makes elastic contact with a top end (5a) of a door glass (5); and a seal lip (13) extending from a lower side of said hollow seal part (12) toward an outer-cabin side, of which top end curves upward and makes elastic contact with an inner-cabin side surface of said door glass (5), thereby forming an eaves-trough-shaped water receiving part (14), wherein:

a lower side wall surface (12b) forming said hollow seal part (12), with which the top end (5a) of said door glass (5) makes elastic contact, has a fin (40) that protrudes toward an outer-cabin side formed on an outer-cabin side edge (110) thereof and a bead part (30) formed from the outer-cabin side edge (110) of said lower side wall surface (12b) that is a position lower than a position on which said fin (40) is formed at least to a position beyond an elastic contact position on the bead part (30) with the top end (5a) of said door glass (5) toward an inner-cabin side; and said bead part (30) is inclined downward.

In addition, according to an aspect of the present invention, an inner-cabin side edge of said bead part (30) is extended to an inner-cabin side surface of said door glass (5) for guiding water (130) flowing along said bead part (30) to said water receiving part (14).

In addition, according to an aspect of the present invention, said bead part (30) is formed in succession of said fin (40).

Symbols in parentheses show constituents or items corresponding to Figures and DESCRIPTION OF PREFERRED EMBODIMENT.

With the structure of the present invention, the weather strip installed on the side edge of the front pillar of the retractable roof vehicle or the hard top vehicle has the hollow seal part and the seal lip provided on the die molded part on the upper side thereof. The hollow seal part makes elastic contact with the top end of the door glass and the seal lip makes elastic contact with the inner-cabin side surface of the door glass when the door glass is closed. As a result, the door glass is doubly-sealed on an upper side and a lower side thereof.

Such a structure prevents the water of rain or car washing from entering the inner-cabin side from the outer-cabin side via a space between the top end of the door glass and the hollow seal part. Even in case the water enters the inner-cabin side, the water that flows down an inner-cabin side surface of the door glass is dammed up by the seal lip and is guided to the eaves-trough-shaped water receiving part. Therefore, the structure is excellent in water-tightness.

In addition, on the die molded part on the upper side of the weather strip, the lower side wall surface forming said hollow seal part has the fin that protrudes toward the outer-cabin side formed on the outer-cabin side edge thereof. As a result, the water of rain or car washing, which flows down the side edge of the roof, is received by the fin.

Such a structure prevents the water that flows along the roof from directly dripping inside the vehicle interior from the die molded part on the upper side of the weather strip and causing the water leak while the door glass is lowered.

Also, the water received by the fin is guided to the bead part formed on the position lower than the position on which the fin is formed. While the singular fin is insufficient for preventing the water from entering the vehicle interior, the fin in combination with the bead part gives direction to flow of water and is improved in sealing property for draining the water smoothly.

Especially, the lower side wall surface of the hollow seal part, with which the top end of the door glass makes elastic contact, has the bead part formed from the outer-cabin side edge at least to the position beyond the elastic contact position on the bead part with the top end of the door glass toward the inner-cabin side and the bead part is inclined downward. Accordingly, in case the bead part is formed on the lower position compared with the fin at a distance from the fin, the water of rain and car washing which flows down the outer-cabin side from the roof and the water of car washing directly poured on the weather strip while the door glass is closed normally collects on the outer-cabin side edge of the lower side wall surface. Then the water thus collected flows down in a longitudinal direction in which the weather strip extends (in a front direction or rear direction of the vehicle) to the bead part and is imperatively guided from the outer-cabin side to the inner-cabin side along the bead part. The water is further guided at least to the position beyond the elastic contact position on the bead part with the top end of the door glass toward the inner-cabin side. As a result, the water directly falls into the eaves-trough-shaped water receiving part; falls down from the inner-cabin side of the lower side wall surface along a wall surface (for example, in the present embodiment, an outer-cabin side vertical wall 17 in FIG. 2 and FIG. 3) which the inner-cabin side of the lower side wall surface abuts; or falls down the inner-cabin side surface of the door glass and is dammed up by the seal lip, and then guided into the eaves-trough-shaped water receiving part.

The bead part bends for the effect of the pressure by the top end of the door glass, thereby forming two ditches respectively on both ends of the bead part. Accordingly, the water, which flows along the bead part, flows along the ditches thus formed while the door glass is closed and is stably guided into water receiving part without water leak into the vehicle interior.

Such a structure prevents the problem according to the prior art that the water that collects on the outer-cabin side edge of the lower side wall surface of the hollow seal part reaches the top end on the front side of the door glass along the longitudinal direction of the weather strip, collects on a gusset, enters the vehicle interior when the door is opened and causes water leak.

Further, a part of the water that collects on the outer-cabin side edge of the lower side wall surface is transmitted to a space between the top end of the door glass and the lower side wall surface of the hollow seal part for the effect of the capillary phenomenon. But the water is shut down by the bead part which is on the front side of a water flow direction or facing the water flow direction or is guided to the inner-cabin side along the bead part and further to the water receiving part. Such a structure prevents the problem according to the prior art that the water which flows down in the frontward direction along the edge of the top end of the door glass reaches the top end on the front side of the door glass and collects on the gusset 21, and the collected water enters vehicle interior when the door is opened.

Furthermore, when the door glass is lowered after the rain or car washing, the water which soaks into the soft top, made of cloth for example, may collect on the outer-cabin side edge of the lower side wall surface. But, even while the door glass is open, the water flows down in a longitudinal direction in which the weather strip extends, is imperatively guided from the outer-cabin side to the inner-cabin side along the bead part and is further guided into the water receiving part. Such a structure prevents the water from entering the vehicle interior and causing the water leak and significantly decreases the amount of the water that drips from the outer-cabin side edge of the lower side wall surface of the hollow seal part.

In addition, since the inner-cabin side edge of the bead part is extended to the inner-cabin side surface of the door glass, the water which flows along the bead part directly falls into the water receiving part or is easily guided from the inner-cabin side of the lower side wall surface along the wall surface (for example, in the present embodiment, the outer-cabin side vertical wall 17 in FIG. 2 and FIG. 3) which the inner-cabin side of the lower side wall surface abuts. Accordingly, the amount of the water is decreased, which flows along the bead part, is transmitted along the inner-cabin side surface of the door glass, is dammed up by the seal lip and is guided to the water receiving part.

Such a structure reduces the burden of sealing function of the seal lip.

In addition, the bead part is formed in succession of the fin for guiding the water received by the fin directly to the bead part. Such a structure is improved in efficiency.

DESCRIPTION OF PREFERRED EMBODIMENT

Figure 1:
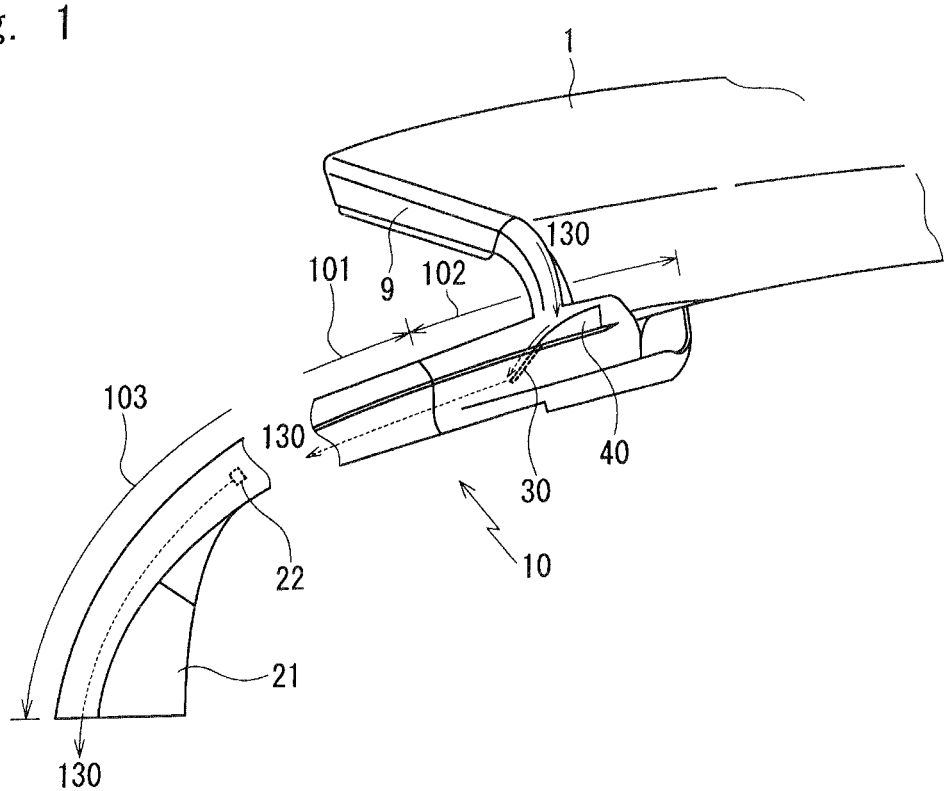
FIG. 1 is a perspective view showing a drainage structure of a weather strip according to an embodiment of the present invention.
Figure 2:
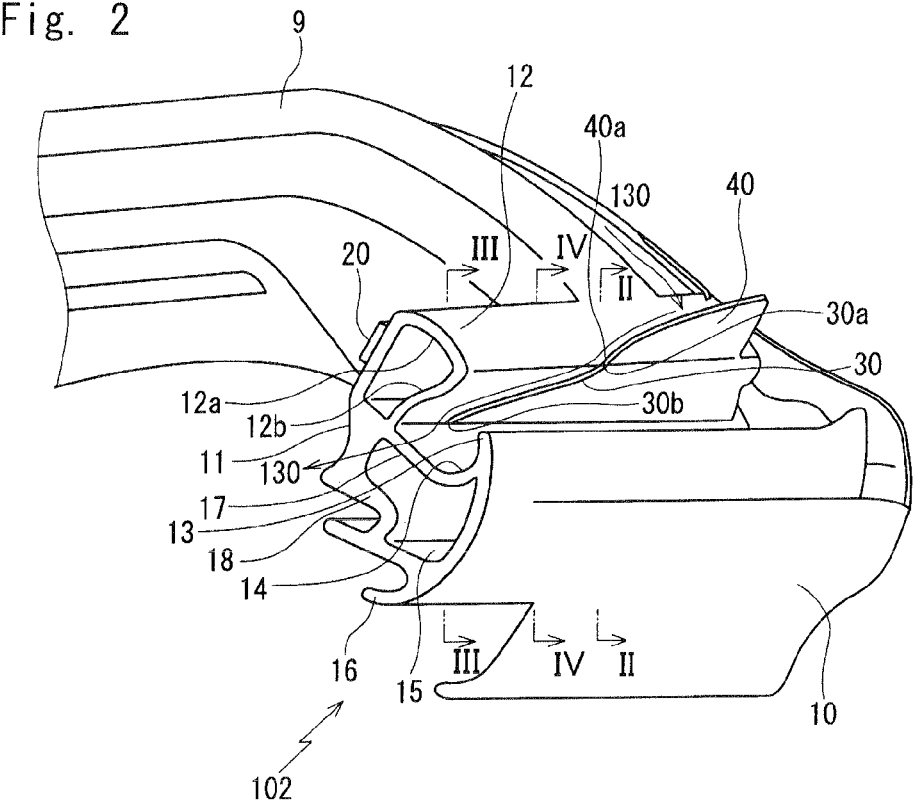
FIG. 2 is an enlarged perspective view showing a die molded part on an upper side of the weather strip of FIG. 1.
Figure 3:
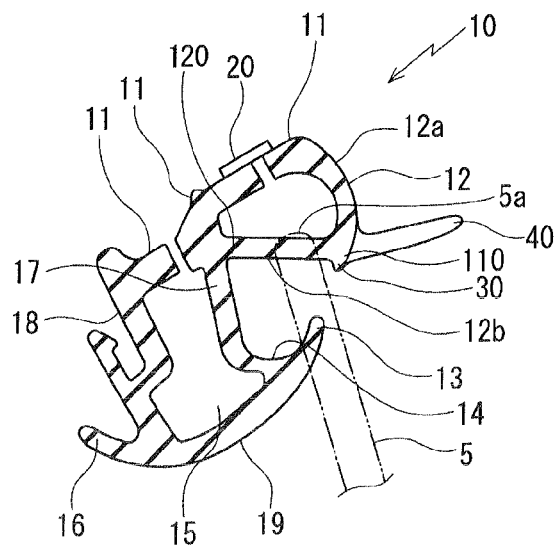
FIG. 3 is a II-II line enlarged cross section of FIG. 2.
Figure 4:
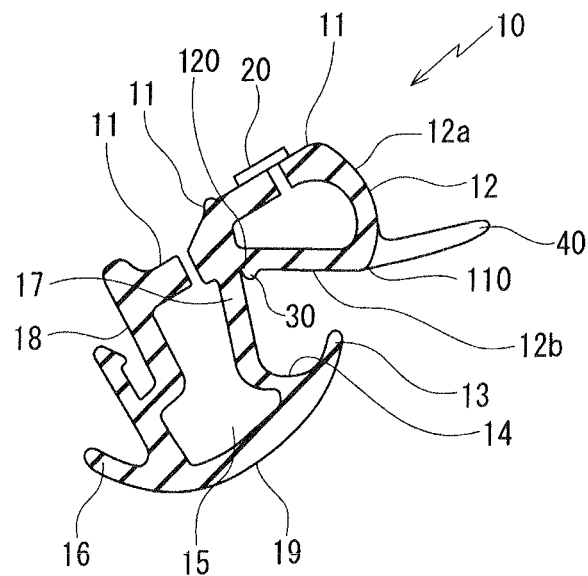
FIG. 4 is a III-III line enlarged cross section of FIG. 2.
Figure 5:
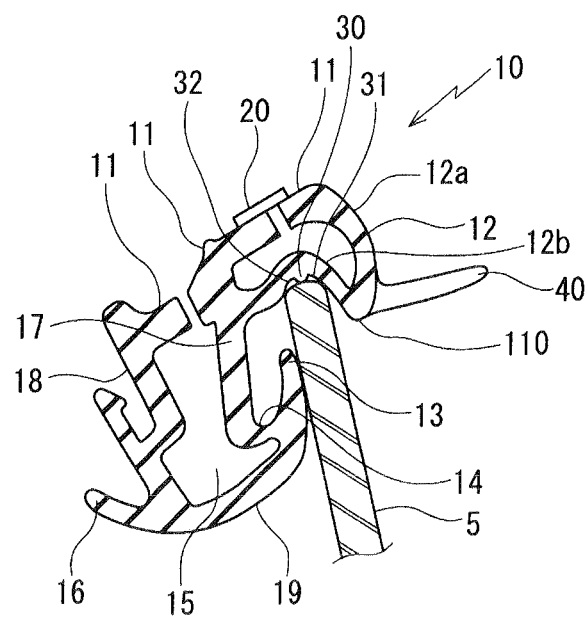
FIG. 5 is a IV-IV line enlarged cross section of FIG. 2, showing a state that a door glass is lifted.

Referring to FIG. 1 to FIG. 5, a drainage structure of a weather strip according to an embodiment of the present invention will be described. FIG. 1 is a perspective view showing a drainage structure of a weather strip according to an embodiment of the present invention. FIG. 2 is an enlarged perspective view showing a die molded part on an upper side (roof side) of the weather strip of FIG. 1. FIG. 3 and FIG. 4 are respectively II-II line and III-III line enlarged cross sections of FIG. 2. FIG. 5 is a IV-IV line enlarged cross section of FIG. 2, showing a state that a door glass is lifted.

When constituents or items correspond to those in prior arts, the same symbols are used.

Figure 6:
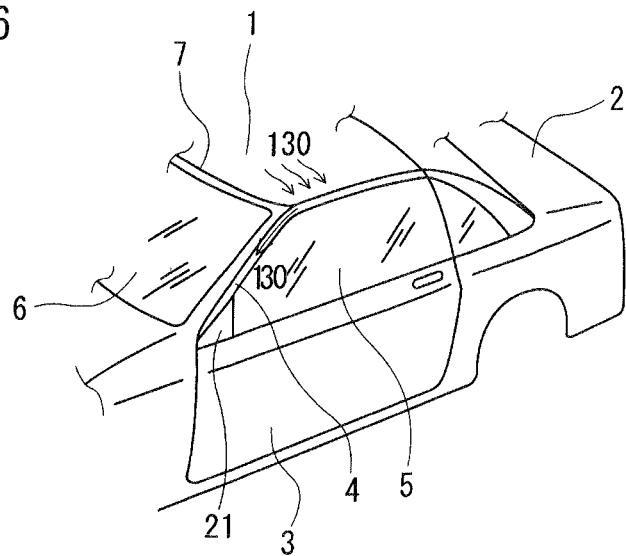
FIG. 6 is an external perspective view of a retractable roof vehicle.
Figure 7:
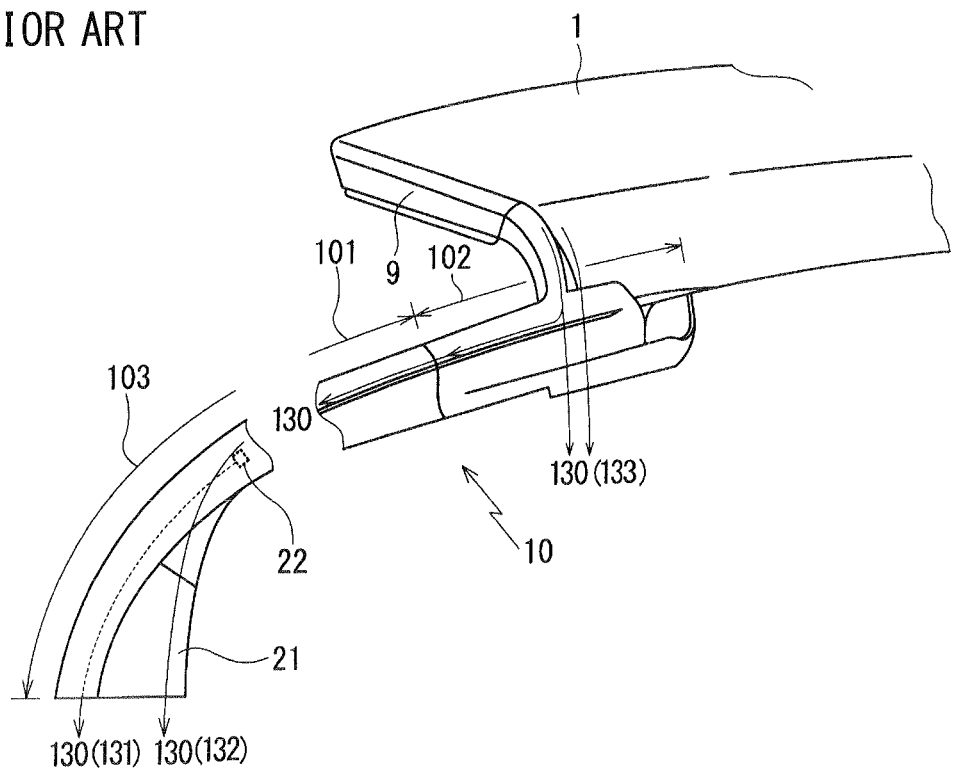
FIG. 7 is a perspective view showing a drainage structure of a weather strip according to a prior art.
Figure 8:
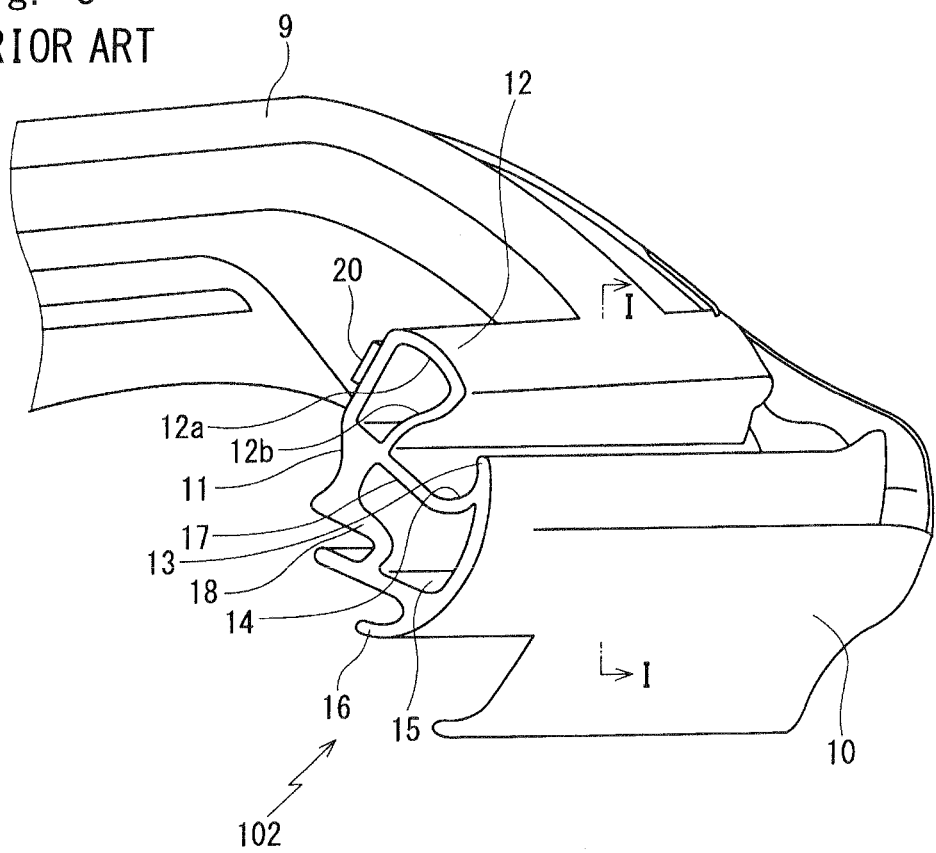
FIG. 8 is an enlarged perspective view showing a die molded part on an upper side of the weather strip of FIG. 7.
Figure 9:
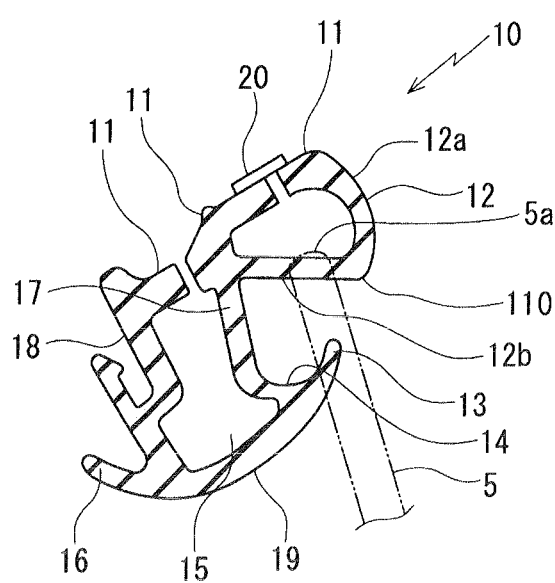
FIG. 9 is a I-I line enlarged cross section of FIG. 8.

The drainage structure of the weather strip according to the embodiment of the present invention relates to vehicles shown in FIG. 6, of which a soft top 1 that opens or closes is folded and put away in a trunk 2. Especially, the invention relates to a die molded part 102 on the upper side of a weather strip 10, having a bead part 30 and a fin 40 formed thereon.

The weather strip 10 is installed on a side edge of a front pillar 4 via tape 20 (alternatively, the weather strip 10 may be fit in holders including retainers). The weather strip 10 makes elastic contact with a door glass (side glass) 5 that lifts or lowers when the door 3 is closed to seal outside and inside of the vehicle. As shown in FIG. 1, the weather strip 10 installed on the side edge of the front pillar 4 comprises an extrusion molded part 101 which has die molded parts 102, 103 connected thereto which are respectively on an upper side and a lower side of the vehicle when the weather strip 10 is assembled on the vehicle. The die molded part 102 on the upper side is connected to an edge of a header weather strip 9 installed on a header 7 which fixes an upper end of a front glass 6 whereas the die molded part 103 on the lower side has a gusset 21 installed thereon, which is unified with a door mirror (not shown).

As shown in FIG. 2, the die molded part 102 on the upper side of the weather strip 10 comprises: an installation base member 11 installed on the side edge of the front pillar 4; a hollow seal part 12 provided downward on an outer-cabin side with respect to the installation base member 11, which makes elastic contact with a top end 5a of a door glass 5; and a seal lip 13 extending from a lower side of said hollow seal part 12 toward an outer-cabin side, of which top end curves upward and makes elastic contact with an inner-cabin side surface of the door glass 5, thereby forming an eaves-trough-shaped water receiving part 14. The seal lip 13 has a hollow part 15 provided on an inner-cabin side thereof and the hollow part 15 has a lip 16 provided on an inner-cabin side thereof which abuts interior material (not shown) including garnish.

The installation base member 11 has a part thereof split for inserting a core for die molding the hollow seal part 12 and the hollow part 15. The installation base member 11 has an outer-cabin side vertical wall 17 provided on a lower side from rough center thereof. The outer-cabin side vertical wall 17 has a seal lip 13 provided on top end thereof. The hollow seal 12 comprises: an outer-cabin side wall surface 12a that curves from an outer-cabin side edge of the installation base member 11 in such a manner as to project toward the outer-cabin side; and a lower side wall surface 12b of which outer-cabin side edge is connected to a lower end of the outer-cabin side wall surface 12a whereas an inner-cabin side edge is connected to an upper part of the outer-cabin side vertical wall 17 at a distance from the installation base member 11. The top end 5a of the door glass 5 as lifted makes elastic contact with rough center of the lower side wall surface 12b.

Figure 10:
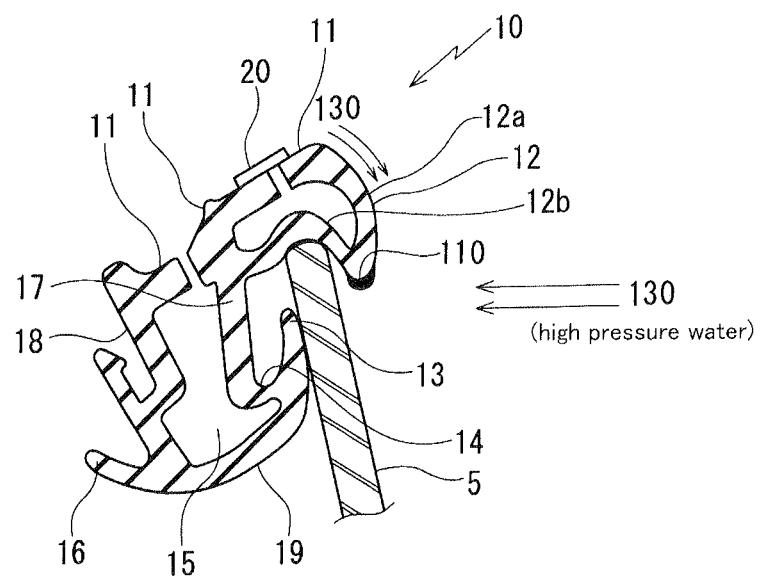
FIG. 10 is I-I line enlarged cross section of FIG. 8, showing a state that a door glass is lifted in FIG. 9.
Figure 11:
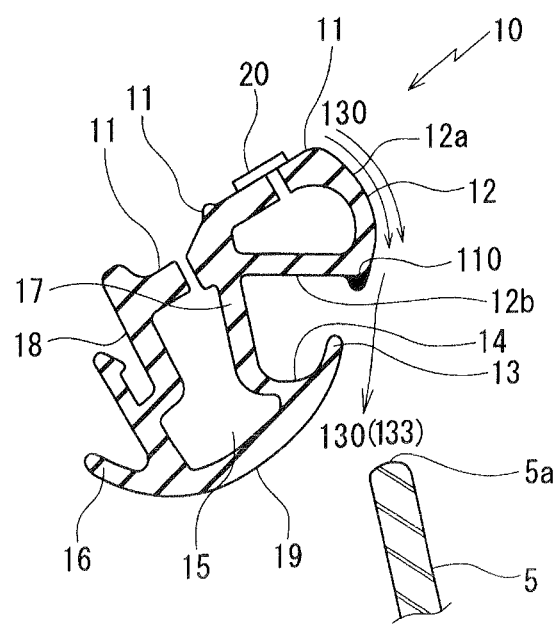
FIG. 11 is I-I line enlarged cross section of FIG. 8, showing a state that a door glass is lowered in FIG. 9.

When the top end 5a of the door glass 5 makes elastic contact, the lower side wall surface 12b curves upward and wraps the top end 5a of the door glass 5 in a manner shown in FIG. 5 and FIG. 10. FIG. 5 shows a position with the bead part 30 and FIG. 10 shows another position without the bead part 30.

The installation base member 11 has an inner-cabin side vertical wall 18 provided on a lower side from the inner-cabin side edge thereof. The hollow part 15 is encircled by the outer-cabin side vertical wall 17, the inner-cabin side vertical wall 18, a bottom wall 19 which connects lower ends of the vertical walls 17, 18 and curves downward, and a part of the installation base member 11 on the inner-cabin side.

As shown in FIG. 1, the die molded part 103 on the lower side has a drainage hole 22 formed thereon, which bores from the water receiving part 14 to the hollow part 15 so that water 130 guided on the water receiving part 14 from an upper side to a lower side of the weather strip 10 is further guided to the hollow part 15 via the drainage hole 22. The water 130 guided to the hollow part 15 is drained outside the vehicle from a front side of the vehicle.

As shown in FIG. 2, the lower side wall surface 12b forming the hollow seal part 12 of the die molded part 102 on the upper side of the weather strip 10 has the bead part 30 formed thereon as well as the fin 40 formed on an outer-cabin side edge 110 of the lower side wall surface 12b, that is a connecting part between an outer-cabin side wall surface 12a and the lower side wall surface 12b, in succession of the bead part 30. A front side edge 40a of the fin 40 comes into contact with an outer-cabin side edge 30a of the bead 30 positioned lower than the position on which the fin is formed.

The bead part 30 is band-like shaped, of which central part protrudes downward thereby forming a projection. The bead part 30 extends from the outer-cabin side edge 110 of the lower side wall surface 12b of the hollow seal part 12 to an inner-cabin side edge 120 of the lower side wall surface 12b, that is a connecting part of the lower side wall surface 12b with the outer-cabin side vertical wall 17, beyond an elastic contact position with the top end 5a of the door glass 5 toward the inner-cabin side in such a manner as to be inclined toward a lower side of the weather strip 10.

The fin 40 is a thin piece that is roughly right-triangular. The fin 40 is formed on an upper side of a position on which the bead part 30 is formed, that is just under the connecting position between an edge of the header weather strip 9 and the weather strip 10 in such a manner as to protrude the outer-cabin side from the outer-cabin side edge 110 of the lower side wall surface 12b. The fin 40 protrudes in a shape of a wing that is widened toward a rear side from a front side. The water 130 that flows down along the header weather strip 9 to the side edge thereof is received by the fin 40, more specifically one side of the fin 40, and is directly guided to the bead part 30 via the front side edge 40a of the fin 40. The bead part 30 guides the water 130 from the inner-cabin side edge 120 of the lower side wall surface 12b to a water receiving part 14.

The bead part 30 and the fin 40 are die molded simultaneously with the weather strip 10 and made of rubber-like elastic body in the same manner as the weather strip 10.

According to the drainage structure of the weather strip according to the embodiment, when the door glass is closed, the top end 5a of the door glass 5 makes elastic contact with the lower side wall surface 12b of the hollow seal part 12 whereas the seal lip 13 makes elastic contact with the inner-cabin side surface of the of the door glass 5. As a result, the door glass 5 is doubly-sealed on an upper side and a lower side thereof. Such a structure prevents the water 130 of rain or car washing from directly entering the inner-cabin side from outer-cabin side. Even in case the water 130 enters the inner-cabin side, the water that flows down the inner-cabin side surface of the door glass 5 is dammed up by the seal lip 13 and is guided to the eaves-trough-shaped water receiving part 14. Therefore, the structure is excellent in water-tightness.

In addition, on the die molded part 102 on the upper side of the weather strip 10, the lower side wall surface 12b of the hollow seal part 12 has the fin 40 that protrudes toward the outer-cabin side formed on the outer-cabin side edge 110 thereof. As a result, the water of rain or car washing, which flows down the side edge of the roof is received by the fin 40.

Such a structure prevents the water 130 that flows along a soft top 1 from directly dripping inside the vehicle interior from the die molded part 102 on the upper side of the weather strip 10 and causing the water leak while the door glass 5 is lowered.

In addition, the water 130 received by the fin 40 is guided to the bead part 30 formed on the position lower than the position on which the fin 40 is formed. While the singular fin 40 is insufficient for preventing the water 130 from entering the vehicle interior, the fin 40 in combination with the bead part 30 improves sealing property.

The fin 40 is formed just under the connecting position between the header weather strip 9 and the weather strip 10. Accordingly, the water 130 that flows along the header weather strip 9 to the side edge thereof is received by the fin 40 and is directly guided to the bead part 30 via the front side edge 40a.

Especially, the lower side wall surface 12b of the hollow seal part 12, with which the top end 5a of the door glass 5 makes elastic contact, has the bead part 30 formed from the outer-cabin side edge 110 to the inner-cabin side edge 120 of the lower side wall surface 12b beyond the elastic contact position with the top end 5a of the door glass 5 toward the inner-cabin side and the bead part 30 is inclined downward toward the inner-cabin side. Accordingly, the water 130 guided to the bead part 30 is imperatively guided from the outer-cabin side of the door glass 5 to the inner-cabin side along the bead part 30 and further to the water receiving part 14. The water 130 is drained outside the vehicle via the drainage hole 22. In addition, since the fin 40 is formed just under the connecting position between the header weather strip 9 and the weather strip 10, the water 130 that flows along the header weather strip 9 to the side edge is received by the fin 40 and is directly guided to the bead part 30 via the front side edge 40a.

The bead part 30 bends for the effect of the pressure by the top end 5a of the door glass 5, thereby forming two ditches 31, 32 respectively on both ends of the bead part 30 as shown in FIG. 5. Accordingly, the water 130, which flows along the bead part 30, flows along the ditches 31, 32 thus formed while the door glass is closed and is stably guided into water receiving part 14 without water leak into the vehicle interior.

Such a structure prevents the problem according to the prior art that the water 130 that collects on the outer-cabin side edge 110 of the lower side wall surface 12b of the hollow seal part 12 flows in the longitudinal direction of the weather strip 10, reaches the top end on the front side of the door glass 5, collects on the gusset 21, enters the vehicle interior when the door 3 is opened and causes the water leak.

While the bead part 30 of the present embodiment is formed in succession of the fin 40, the bead part 30 may also be formed on a lower side of the fin 40 leaving a space therebetween.

The water 130 of rain and car washing which flows along the soft top 1 toward the outer-cabin side and the water 130 of car washing directly poured on the weather strip 10 normally collects on the outer-cabin side edge 110 of the lower side wall surface 12b of the hollow seal part 12 while the door 5 is closed. Then, in case the space is provided between the fin 40 and the bead part 30, the water 130 thus collected flows down in a longitudinal direction in which the weather strip 10 extends (in a front direction of the vehicle in the present embodiment), is imperatively guided from the outer-cabin side of the door glass 5 to the inner-cabin side along the bead part 30 and further to the water receiving part 14. The water 130 is drained outside the vehicle via the drainage hole 22.

In addition, a part of the water 130 collected on the outer-cabin side edge 110 of the lower side wall surface 12b of the hollow seal part 12 is transmitted to a space between the top end 5a of the door glass 5 and the lower side wall surface 12b of the hollow seal part 12 for the effect of the capillary phenomenon. But the water 130 is shut down by the bead part 30 on the front side of or that faces a water 130 flow direction or is guided to the inner-cabin side along the bead part 30 and further to the drainage hole 22 via the water receiving part 14. Such a structure prevents the problem according to the prior art that the water 130 which flows down in the frontward direction along the edge of the top end 5a of the door glass 5 reaches the top end on the front side of the door glass 5 and collects on the gusset 21, and then the collected water 130 enters the vehicle interior when the door is opened.

In addition, when the door glass 5 is lowered after the rain or car washing, the water 130 which soaks into the soft top 1, especially the soft top 1 made of cloth, may collect on the outer-cabin side edge 110 of the lower side wall surface 12b of the hollow seal part 12. But, even while the door glass 5 is open, the water 130 flows down in a longitudinal direction in which the weather strip 10 extends to the bead part 30, is imperatively guided from the outer-cabin side to the inner-cabin side along the bead part 30 and is further guided to the drainage hole 22 via the water receiving part 14. Such a structure prevents the water 130 from entering the vehicle interior and significantly decreases the amount of the water 130 that drips from the outer-cabin side edge 110 of the lower side wall surface 12b. Further, on the die molded part 102 on the upper side of the weather strip 10, the water 130 which flows along the header weather strip 9 to the side edge is also received by the fin 40 while the door glass 5 is lowered. Such a structure prevents the problem according to the prior art that the water 130 directly drips inside the vehicle interior and cause the water leak.

While the present embodiment discloses that the bead part 30 and the fin 40 are made of rubber-like elastic body and are die molded simultaneously with the weather strip 10, either or both of the bead part 30 and the fin 40 may be molded separately from the weather strip 10 and adhered on the weather strip 10 after molding, not integrally molded with the weather strip 10. In addition, the bead part 30 is not necessarily made of rubber-like elastic body because any bead part 30 as a water course that guides the water 130 from the outer-cabin side beyond the top end 5a of the door glass 5 toward the inner-cabin side performs water-proof effect. Also, the fin 40 is not necessarily made of rubber-like elastic body.

The inner-cabin side edge 30b of the bead part 30 is extended to the inner-cabin side edge 120 of the lower side wall surface 12b but the inner-cabin side edge of the bead part 30 may be extended at least beyond the elastic contact position with the top end 5a of the door glass 5 toward the inner-cabin side. More specifically, the water 130 guided to the bead part 30: directly falls into the eaves-trough-shaped water receiving part 14; falls down from the inner-cabin side of the lower side wall surface 12b along the outer-cabin side vertical wall 17; or falls down the inner-cabin side surface of the door glass 5, is dammed up by the seal lip 13 and guided into the eaves-trough-shaped water receiving part 14. Such a structure prevents the water 130 from entering the vehicle interior and causing water leak.

In addition, in case the inner-cabin side edge of the bead part 30 is extended to the inner-cabin side surface of the door glass 5 or to an upper side of a line in a vertical direction of the water receiving part 14, the water 130 which flows along the bead part 30 is directly guided to the water receiving part 14. Accordingly, the amount of the water 130 is decreased, which is transmitted along the inner-cabin side surface of the door glass 5, dammed up by the seal lip 13 and guided to the water receiving part 14. Such a structure reduces the burden of sealing function of the seal lip 13.

While the bead part 30 of the present embodiment is formed on the die molded part 102 on the upper side of the weather strip 10 installed on the side edge of the front pillar 4 of the retractable roof vehicle, the bead part 30 may also be formed on a die molded part on the upper side of a weather strip installed on a side edge of a front pillar of a hard top vehicle. In addition, the bead part 30 of the present invention may be adopted on the retractable roof vehicle including: a soft top roof; a roof comprising a roof panel and a back window panel at the back of the roof panel which are folded and put away in the trunk 2 while the roof panel as folded is piled on the back window panel; and a removal roof.

We claim:

1. A drainage structure of a die molded part on an upper side of a weather strip comprising: an installation base member installed on a side edge of a front pillar of a retractable roof vehicle or a hard top vehicle; a hollow seal part provided downward on an outer-cabin side with respect to said installation base member, which makes elastic contact with a top end of a door glass; and a seal lip extending from a lower side of said hollow seal part toward an outer-cabin side, of which a top end curves upward and makes elastic contact with an inner-cabin side surface of said door glass, thereby forming an eaves-trough-shaped water receiving part, wherein:

a lower side wall surface forming said hollow seal part, with which the top end of said door glass makes elastic contact, has a fin that protrudes toward an outer-cabin side formed on an outer-cabin side edge thereof and a bead part formed from the outer-cabin side edge of said lower side wall surface that is a position lower than a position on which said fin is formed at least to a position beyond an elastic contact position on the bead part with the top end of said door glass toward an inner-cabin side; and said bead part is inclined downward;

an inner-cabin side edge of said bead part is extended to an inner-cabin side surface of said door glass for guiding water flowing along said bead part to said water receiving part; and the bead part deforming as a result of the pressure by the top end of the door glass, thereby forming two depressions respectively on both sides of the bead part.

2. The drainage structure of the weather strip as claimed in claim 1, wherein:

the bead part is formed to the inner-cabin side edge of the lower side wall surface.

3. The drainage structure of the weather strip as claimed in claim 1, wherein:

said bead part is formed in succession of said fin.

4. The drainage structure of the weather strip as claimed in claim 2, wherein:

said bead part is formed in succession of said fin.

5. The drainage structure of the weather strip as claimed in claim 3, wherein:

the fin protrudes in a shape of a wing that is widened toward a rear side from a front side.

6. The drainage structure of the weather strip as claimed in claim 4, wherein:

the fin protrudes in a shape of a wing that is widened toward a rear side from a front side.

* * * * *